United States Patent
Fike

[15] 3,669,864
[45] June 13, 1972

[54] POLAROGRAPHIC ELECTRODE APPARATUS AND METHOD

[72] Inventor: Robert R. Fike, 5012 LeMans Drive, Indianapolis, Ind. 46205

[22] Filed: Sept. 2, 1969

[21] Appl. No.: 854,660

[52] U.S. Cl. ..........................................204/195 R, 204/1 T
[51] Int. Cl. .......................................................G01n 27/46
[58] Field of Search..........................................204/1 T, 195

[56] References Cited

UNITED STATES PATENTS

| 2,886,771 | 5/1959 | Vincent | 204/195 |
| 3,151,052 | 9/1964 | Arthur | 204/195 |
| 3,497,442 | 2/1970 | Loius-Calude Vincent | 204/195 |

OTHER PUBLICATIONS

Olson et al., " Anal. Chim. Aita," Vol. 22, 1960, pp. 582– 589
Meier et al., " Anal. Chem.," Vol. 41, 1969, pp. 914– 918

Primary Examiner—T. Tung
Attorney—Griswold & Burdick, Maynard R. Johnson and C. Kenneth Bjork

[57] ABSTRACT

A polarographic electrode assembly comprising a confined working electrode is described. The electrode assembly is adapted to fit against a portion of a thin layer chromatogram to form a polarographic cell in which the electrodes of the electrode assembly are all in contact with an isolated zone of the thin layer containing a spot of substance to be assayed. A method of using the polarographic electrode assembly to assay materials separated by thin layer chromatography without elution of the spots containing the substance is also described.

5 Claims, 3 Drawing Figures

INVENTOR.
Robert R. Fike
BY
Maynard R. Johnson
ATTORNEY

POLAROGRAPHIC ELECTRODE APPARATUS AND METHOD

BACKGROUND OF THE INVENTION

Polarographic analyzers and electroanalytical techniques employing the same are well known in the prior art. Many different electroanalytical techniques have been employed with polarographic analyzers, such as voltammetry, chronoamperometry, as well as cathodic and anodic stripping analyses. Polarographic analyzers and techniques for employing the same in electroanalytical methods for both quantitative and qualitative analyses are described by Louis Meites, Polarographic Techniques, Second Edition, Interscience, New York (1965). Carbon paste electrodes have been employed in polarographic analyses. Olson and Adams, Anal. Chim. Acta, 22, 582 (1960); Adams, Review of Polarography (Japan) 11, 71, (1963); and Meier and Chambers, Analytical Chemistry, 41, 914 (1969).

A typical polarograph cell includes a working electrode, a reference electrode and a counter electrode spaced apart but electrically connected by means of an electrolyte. An electroactive substance to be analyzed is typically dissolved in the electrolyte, and is measured by varying the potential in the electrical circuit between the working electrode and the reference electrode and measuring the current in such circuit across the cell. The counter electrode is employed to compensate for the resistance in the polarographic cell, typically by maintaining the potential of the counter electrode equal to the potential of the reference electrode and subtracting any current flowing between the reference and counter electrodes from measurements of current in the circuit between the reference electrode and the working electrode.

Thin layer chromatography techniques have long been used in the separation of substances as "spots" in a thin layer of adsorbent. Such techniques typically involve the movement of a solvent containing the substance or substances to be separated through a thin layer of an adsorbent supported on a plate. Techniques for fabricating thin layer chromatography plates, materials employed in the thin layer and techniques for separation of substances thereon are described, for example, by Kirchner in Thin Layer Chromatography, Volume XII of Techniques of Organic Chemistry, Edited by Perry and Weissberger, Interscience, New York (1967) and by Kurt Randerath in Thin Layer Chromatography, Verlag Chemie, Acedemic Press, New York (1966). Various techniques for quantitative analyses of materials isolated as spots in thin layer chromatography have been employed, however, the most accurate of such techniques have generally involved separation of a portion of the thin layer which contains the substance as a spot thereon from the thin layer chromatogram, followed by elution of the substance from the spot portion of the thin layer prior to analysis. See Randerath, pages 74–76. The elution step requires several additional handling procedures before the material isolated as a spot on the thin layer chromatogram can be assayed. Elution also introduces a source of error, since the material to be assayed must be diluted by a solvent employed in eluting the substance from the separated portion of the thin layer. Portions of the dilute solution can be lost in transfer from one vessel to another, and the concentration of material to be assayed is greatly reduced by dilution. It would be desirable to provide polarographic apparatus and a method in which polarographic analyses can be performed directly on a thin layer chromatography plate without separating and eluting the spots containing the substance to be analyzed.

BRIEF SUMMARY OF THE INVENTION

The invention is directed to polarographic analyses of substances which are separated as a spot or detectable zone on a thin layer of adsorbent material by means of a thin layer separatory technique such as thin layer chromatography, electrophoresis or the like. More particularly, the invention is directed to a polarographic electrode assembly adapted to form a polarographic cell in combination with a portion of a thin layer chromatography plate, and to a method for forming such a polarographic cell.

The apparatus of the invention provides a polarographic electrode assembly adapted for use in direct polarographic assay of electroactive materials, that is, substances susceptible to assay by polarographic techniques, the electroactive materials being isolated as spots in thin layer separatory techniques. The invention further provides a method for direct polarographic assay of a substance separated by thin layer separatory techniques such as thin layer chromatography in which elution of the substance from the thin layer can be eliminated. The invention further provides a polarographic cell for use in combination with thin layer chromatography techniques in which a portion of a thin layer chromatogram forms an integral portion of the polarographic cell.

These and other objects and advantages of the invention will be apparent from the following detailed description and the drawings.

DESCRIPTION OF THE PREFERRED EMBODIMENTS

Figure 1:
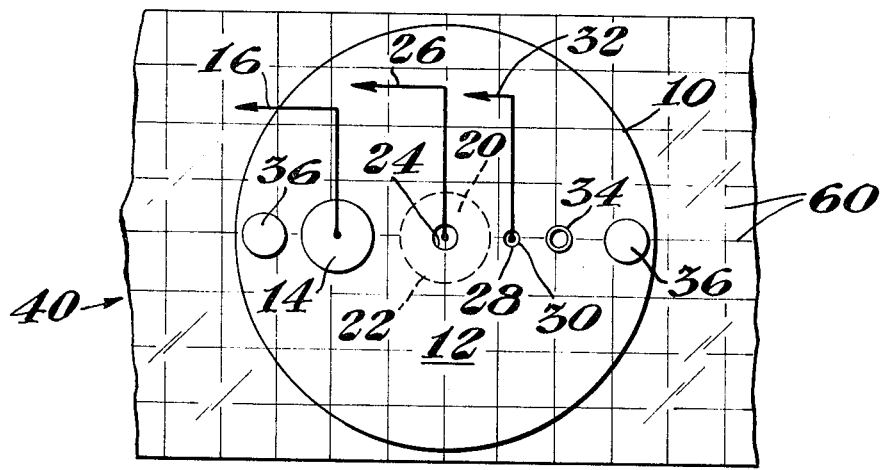
FIG. 1 is a plan view of one embodiment of the polarographic electrode assembly of the invention.
Figure 3:
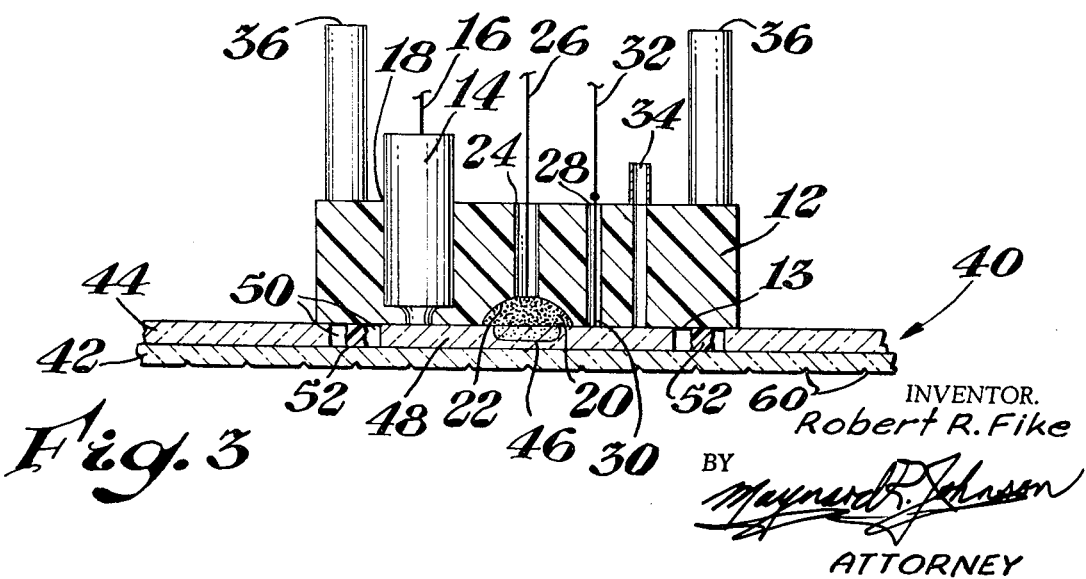
FIG. 3 is an elevational view partly in section and illustrative of a polarographic cell formed by the electrode assembly of FIG. 1 and the plate of FIG. 2.

In the embodiment shown in FIGS. 1 and 3 the electrode assembly 10 comprises a circular electrode holder 12 having a smooth face 13. The electrode holder 12 includes a reference electrode well 18 in which a reference electrode 14 is disposed. The electrode holder 12 also includes a well 22 in the face 13 thereof adapted to receive a confined working electrode, e.g., carbon paste working electrode 20. The term "confined" is employed herein in reference to the working electrode to indicate an electrode having a definite volume and a predetermined area at the face 13 of the electrode holder in distinction from an unconfined electrode such as a dropping mercury electrode having a volume and surface area which changes with time. Working electrode 20 is adapted to contact and cover completely the entire surface of a spot of substance to be analyzed. A bore 24 extends through electrode holder 12 from the working electrode well 22 to provide access for a working electrode lead 26 which contacts the carbon paste electrode 20 at one end of the lead 26 and extends therefrom through the bore 24. A counter electrode 30 is similarly disposed at face 13 of electrode holder 12 through a counter electrode well 28, and is connected to a counter electrode lead 32. Reference electrode 14, working electrode 20 and counter electrode 30 are each disposed in their respective wells 18, 22, 28 so as to be flush with the face 13 of electrode holder 12. The working electrode lead 26 and counter electrode lead 32, as well as reference electrode lead 16 are connected to the appropriate input jacks of a polarographic analyzer (not shown). The electrode holder 12 also includes an electrolyte inlet 34 for passing an electrolyte liquid through the electrode holder 12 to the face 13 thereof. A pair of weights 36 are provided on electrode holder 12 to maintain seating of the electrode holder 12 with its face 13 and electrodes 14, 20, 30 firmly against a thin layer chromatography plate.

The reference electrode 14, carbon paste working electrode 20, and counter electrode 30 can be similar in construction to prior art reference electrodes, carbon paste electrodes, and counter electrodes, and serve the same functions as reference electrodes, working electrodes, and counter electrodes in other polarographic cells. For example in the embodiments of FIG. 1 and FIG. 3 the reference electrode can be a saturated calomel reference electrode (for example, an electrode such as the electrodes sold under the name Beckman No. 41239 Hyperjunction calomel electrode). The carbon paste working electrode 20 can be made from an intimate mixture of 10 grams of spectroscope grade graphite with 7 milliliters of mineral oil firmly packed into the carbon paste electrode well 22 and made flush with the face 13 of electrode holder 12 by passing a straight edge across face 13 of electrode holder 12 to remove any excess carbon paste protruding beyond well 22. In lieu of the carbon paste, the working electrode 20 can be of another material suitable for use as an electrode in a polarographic cell, it being essential, however, that working electrode material be confined so as to present a predetermined area at the face 13 of the electrode holder and be adapted to cover and contact completely a spot on a chromatogram. For example, a platinum, gold or silver button or plate can be employed as the working electrode. Mercury can also be employed by placing the mercury in working electrode well 22 after the electrode holder 12 is placed against a thin layer separatory plate so that the mercury electrode will be confined by the working electrode well and the thin layer plate. Since the solid electrode materials such as carbon paste, platinum, gold and the like are inherently confined by their physical properties as solids they can be employed in the apparatus of the invention without the special handling required to confine mercury, and a carbon paste working electrode is greatly preferred. The working electrode lead 26 is preferably of platinum wire. The electrode holder 12 can be glass or plastic, preferably transparent, and adapted to insulate the electrodes 14, 20, 30 from each other.

Figure 2:
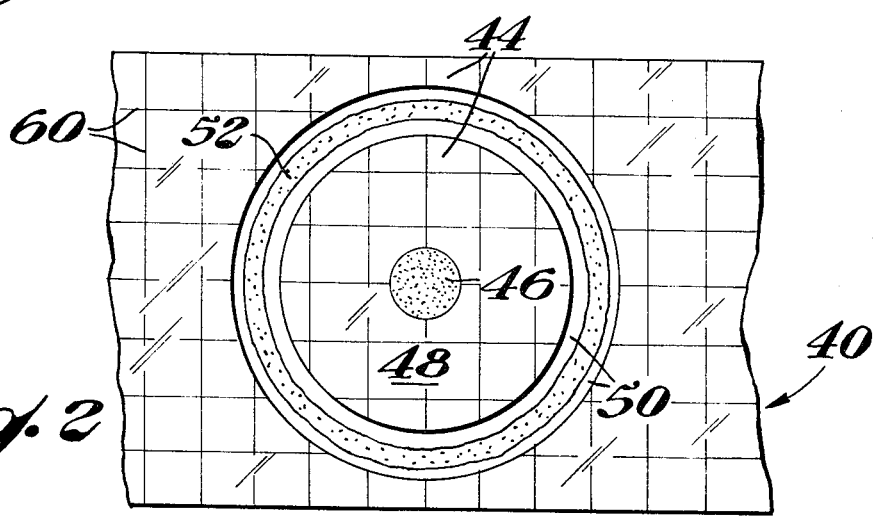
FIG. 2 is a plan view of a portion of a thin layer chromatogram illustrating the isolation of spot-containing zone thereon preparatory to formation of a polarographic cell in conjunction with the electrode assembly of FIG. 1.

Referring more particularly to FIGS. 2 and 3, a thin layer separatory plate, e.g., thin layer chromatography plate 40, comprises a rigid support plate 42 having a thin layer 44 of an adsorbent material disposed thereon. A spot 46 of separated electroactive material or substance to be analyzed and which has been separated on the thin layer chromatography plate 40 by conventional chromatographic techniques is shown as a shaded portion in FIGS. 2 and 3. A circular zone 48 of the thin layer material 44 surrounding and including the spot 46 is isolated from the remainder of the thin layer 44 by removal of the thin layer adsorbent material to form a boundary area 50 surrounding and defining the zone 48. The boundary area 50 separates the substance in spot 46 as substantially the only electroactive compound in isolated zone 48. The isolated zone 48 including the spot 46 is of sufficient size to permit portions of the zone 48 to contact both the reference electrode 14 and the counter electrode 30 when the working electrode 20 contacts the spot 46. The boundary 50 between the isolated zone 48 and the remainder of the thin layer 44 can be prepared conveniently by scraping, abrading or otherwise removing a portion of thin layer 44 from the support plate 42. In a preferred embodiment shown in FIGS. 1 and 3 the lower surface of the thin layer chromatography support plate 42 is provided with a plurality of reference grid lines 60 to facilitate the initial location of the spot 46 and the disposition of the electrode holder 12 directly over the isolated zone so that the carbon paste working electrode 20 is disposed directly against and in contact with spot 46.

Zone 48 and spot 46 are further isolated from the remainder of the thin layer 44 by a closed-loop isolation barrier 52 disposed in the boundary area 50 and completely surrounding the isolated zone 48. The isolation barrier 52 is a material which is adapted to form a seal between the glass support 42 and the electrode holder 12 when electrode holder 12 is disposed with its face 13 against thin layer 44 as shown in FIG. 3. The barrier 52 is substantially impermeable to electrolyte solutions of the type employed in polarographic analyses. Barrier 52 serves to seal such an electrolyte solution and the isolated zone 48 and spot 46 of the thin layer 44 between the face 13 of electrode holder 12 and the thin layer chromatography support plate 42. The isolation barrier 52 should also be of a nonconducting material so that the isolated zone 48 of the thin layer 44 is in electrical as well as hydraulic isolation from the remainder of the thin layer 44.

The thin layer 44 is fabricated of material which will not detrimentally interfere with polarographic analyses, that is, thin layer 44 permits substantially uniform diffusion of an electrolyte solution therethrough, preferably at a fairly rapid rate, permits limited diffusion of the substance to be assayed, and is substantially inert to electrochemical oxidation and reduction under the conditions of use so that the electrochemical activity of the thin layer material does not significantly affect the polarographic assay of the electroactive substance to be analyzed. The thin layer 44 can be silica gel, alumina gel, starch gel, agar gel or other like adsorbent gels conventionally employed to form the thin layer of a thin layer chromatography plate or electrophoresis cell. Alternately thin layer 44 can be paper. While the embodiment of the drawings is described with respect to thin layer chromatography, it will be apparent that the invention is also applicable to other thin layer separatory techniques such as electrophoresis. The barrier 52 can be semi-solid material such as a silicone which has been extruded into the boundary 50 to form a barrier seal about the complete circumference of isolated zone 48. Alternately, a thin rubber gasket or the like can be employed to form the isolation barrier 52.

When the electrode assembly 10 is disposed against the thin layer chromatography plate 40 as shown in FIG. 3 the carbon paste working electrode 20 is directly over and in contact with the entire surface of the spot 46 to be assayed. Contact of the working electrode 20 with the entire surface of spot 46 is essential to minimize the effect of possible variations in the concentration of the electroactive material within the spot 46 itself. Preferably, the working electrode 20 overlaps the periphery of spot 46 somewhat and also contacts the isolated zone immediately surrounding the spot 46 as shown in FIG. 3, thus ensuring complete contact. Thus the area of the working electrode 20 in the plane of the face 13 of electrode holder 12 is at least as great as, and preferably greater than, the area of spot 46 in the plane of the thin layer 44. Further, the reference electrode 14 and the counter electrode 30 are both in contact with the isolated zone 48 of the thin layer gel material 44 inside the boundary 50, and both electrodes are within the circumference of barrier 52. Both the reference electrode 14 and counter electrode 30 contact portions of the thin layer 44 which are spaced from spot 46 so that when electrical current flows between the reference electrode 14 and the working electrode 20 or counter electrode 30 any electrochemical reaction of the material in spot 46 takes place at the carbon paste working electrode 20 rather than at the other electrodes 14, 30. Similarly, electrolyte inlet 34 is in fluid communication with the isolated zone 48 and within the periphery of the barrier 52. The thin layer chromatography plate 40 and the electrode assembly 10 thus form a polarographic cell defined by the electrode assembly 10, barrier 52 and support plate 42. The volume of the cell can be small, being the volume between the face 13 of electrode holder 12, and support plate 42 within the barrier 52. Weights 36 serve to maintain the electrode assembly 10 in position against thin layer plate 40 with electrodes 14, 20, 30 in contact with the isolated zone 48. The polarographic cell can be prepared for use by adding an electrolyte solution to the cell through electrolyte inlet 34, allowing the solution to diffuse completely through the isolated zone 48 to saturate the cell formed by the electrode assembly 10 support plate 42 and isolation barrier 52. The reference electrode lead 16, working electrode lead 26, and counter electrode lead 32 are connected to the appropriate jacks on a polarographic analyzer (not shown). The material isolated in the spot 46 can then be assayed as desired by classical electroanalytical techniques, such as cathodic or anodic stripping analysis, chronoamperometry or the like, typically employing a potential range of from about −1.0 to about +1.2 volts at the carbon paste working electrode.

In a representative procedure for assaying a material employing the electrode assembly 10 and thin layer chromatography plate 40 of the invention, the material to be assayed is first separated by classical thin layer chromatography techniques as a spot 46 on a thin layer chromatography plate 40 comprising a thin layer of adsorbent or gel 44 such as silica gel on a support plate 42 such as a glass plate. The chromatography solvent is evaporated and the spot located. After the spot has been located on the thin layer chromatography plate 40 a circular portion of the adsorbent gel is removed from the plate to form a boundary 50 surrounding an isolated zone which contains the spot 46. The isolated zone is further isolated from the remainder of the thin layer 44 by forming a closed-loop barrier 52 about isolated zone 48, in the boundary 50. When the barrier 52 is formed from a flowable material such as a silicon stopcock grease the application thereof to the support plate 42 in the boundary area 50 is conveniently carried out by extruding the barrier material into boundary area 50 with care being taken to prevent any of the barrier material from contacting the silica gel thin layer 44 within the isolated zone 48. Disposition of the barrier material entirely within boundary 50 helps prevent fouling of the electrode contacts and also minimizes the thickness of the polarograph cell, ensuring that the electrodes 14, 20, 30 and face 13 of electrode holder 12 will be flush against the thin layer in isolated zone 48. The electrode assembly 10, with its reference electrode 14, carbon paste working electrode 20 and counter electrode 30 all disposed therein flush with the face 13 of electrode holder 12, is then seated against the thin layer 44 so that the carbon paste working electrode 22 is directly over and in contact with the entire surface of the spot 46. The electrode assembly 10 is placed against the thin layer chromatography plate 40 so that a fluid-tight seal is obtained between the electrode assembly 10 and the support plate 42 by way of the mutual contact with the barrier 52. Proper placement of the electrode assembly 10 so that a polarographic cell is formed between the face 13 of the electrode holder 12, the barrier 52, and the support plate 42 of the thin layer chromatography plate 40 can be facilitated by the use of positioning means, e.g., the reference grid lines 60. Alternately, a transparent electrode holder 12 and support plate 42 can be employed and the support plate 42 can be backlighted as the electrode assembly 10 is lowered into position. In a convenient procedure the electrode assembly is rotated slightly after being disposed against the thin layer 44 to insure proper sealing with the barrier 52. The polarographic cell thus formed by the electrode assembly 10, thin layer chromatography support plate 42 and barrier 52 is adapted, upon addition of a supporting electrolyte and connection of the electrode leads 16, 26, 32 to the appropriate jacks of a polarogaphic analyzer, to be employed in analysis of the isolated substance forming the spot 46 by classical techniques. For example, in a typical operation a supporting electrolyte can comprise a mixture of 1 part by volume aqueous 0.5 molar sodium acetate and 1 to 4 parts methanol. Employing a conventional thin layer chromatography plate and an electrode assembly about 2-3 inches in diameter, low-volume polarograph cells can be formed which require from 100 to 200 microliters or less of electrolyte. Since the volume of the polarographic cell formed by the electrode assembly 10, barrier 52 and support plate 42 is very small, being only slightly greater than the volume of the isolated zone 48 of the thin layer material, and since the substance being analyzed is further restricted in the spot 46, the concentration of the substance being assayed in the supporting electrolyte is much higher than could be obtained if techniques employing an elution step were involved. In a typical operation, such cells can be employed for assays of organic compounds in amounts of 1-10 micrograms or less directly on thin layer chromatograms by techniques such as voltammetry, chronoamperometry or cathodic or anodic stripping analysis.

Many modifications can be made as desired to adapt the apparatus and method of the invention to particular situations, such as by altering the shape of the confined working electrode to correspond to the shape of different spots obtained by thin layer separation; by isolating the spot in a zone of the thin layer material by various other procedures; or by employing springs, clamps or the like to seat the electrode assembly firmly against the thin layer plate, for example.

What is claimed is:

1. A polarographic cell comprising
   a support plate,
   thin layer separatory means for retaining a substance to be analyzed as a spot in a thin layer; said thin layer means including a layer of adsorbent material on the support plate,
   an electrode holder having a face thereof disposed against the thin layer separatory means,
   a reference electrode mounted in the electrode holder and contacting the thin layer separatory means,
   a confined working electrode mounted in the electrode holder spaced from the reference electrode and contacting the thin layer separatory means; said working electrode being adapted to contact a spot in the thin layer of the separatory means,
   closed-loop barrier means between the support plate and the electrode holder and surrounding the thin layer separatory means for providing a seal between the support plate and electrode holder to enclose the thin layer separatory means therebetween whereby a polarographic cell is defined and bounded by the support plate, electrode holder and barrier means.

2. The cell of claim 1 further comprising inlet means for introducing an electrolyte into the cell.

3. The cell of claim 2 wherein the working electrode is a carbon paste electrode.

4. The cell of claim 1 further comprising a counter electrode contacting the thin layer separatory means and spaced from the reference electrode and working electrode.

5. The cell of claim 1 wherein the thin layer separatory means and the support plate comprise a thin layer chromatogram.

* * * * *